United States Patent
Wang

(10) Patent No.: US 10,885,720 B2
(45) Date of Patent: Jan. 5, 2021

(54) VIRTUAL DISPLAY METHOD, DEVICE, ELECTRONIC APPARATUS AND COMPUTER READABLE STORAGE MEDIUM

(71) Applicant: BOE TECHNOLOGY GROUP CO., LTD., Beijing (CN)

(72) Inventor: Ran Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/406,619

(22) Filed: May 8, 2019

(65) Prior Publication Data
US 2020/0035037 A1 Jan. 30, 2020

(30) Foreign Application Priority Data

Jul. 27, 2018 (CN) .......................... 2018 1 0847519

(51) Int. Cl.
*G06T 19/20* (2011.01)
*G06T 7/13* (2017.01)
*G06T 5/00* (2006.01)

(52) U.S. Cl.
CPC .............. *G06T 19/20* (2013.01); *G06T 5/003* (2013.01); *G06T 7/13* (2017.01); *G06T 2219/2008* (2013.01); *G06T 2219/2012* (2013.01); *G06T 2219/2016* (2013.01)

(58) Field of Classification Search
CPC ........... G06T 19/20; G06T 7/13; G06T 5/003; G06T 2219/2008; G06T 2219/2012; G06T 2219/2016
See application file for complete search history.

(56) References Cited

U.S. PATENT DOCUMENTS

| | | | | |
|---|---|---|---|---|
| 2011/0142335 | A1* | 6/2011 | Ghanem | ............... G06K 9/6215 382/165 |
| 2017/0140578 | A1 | 5/2017 | Xiao et al. | |
| 2019/0050427 | A1* | 2/2019 | Wiesel | .................... G06T 19/00 |

FOREIGN PATENT DOCUMENTS

| | | |
|---|---|---|
| CN | 104008571 A | 8/2014 |
| CN | 107578305 A | 1/2018 |

* cited by examiner

*Primary Examiner* — Tapas Mazumder
(74) *Attorney, Agent, or Firm* — Nath, Goldberg & Meyer; Joshua B. Goldberg; Stephanie F. Majkut

(57) ABSTRACT

A virtual display method, device, electronic apparatus, and computer readable storage medium are provided. The virtual display method includes: obtaining a first image including information on a first target which includes at least one of a shoe, a piece of clothes, and an accessory; extracting the information on the first target from the first image to generate a second image; and photographing a second target with the second image as a foreground to obtain and display a third image including the information on the first target and the information on the second target which includes a human body.

14 Claims, 2 Drawing Sheets

VIRTUAL DISPLAY METHOD, DEVICE, ELECTRONIC APPARATUS AND COMPUTER READABLE STORAGE MEDIUM

CROSS-REFERENCE TO RELATED APPLICATIONS

The present application claims the priority of Chinese Patent Application No. 201810847519.1, titled "VIRTUAL DISPLAY METHOD, DEVICE, ELECTRONIC APPARATUS AND COMPUTER READABLE STORAGE MEDIUM" and filed on Jul. 27, 2018, the contents of which are incorporated herein in their entirely by reference.

TECHNICAL FIELD

The present disclosure relates to the field of image processing technology, and particularly, to a virtual display method, device, electronic apparatus and computer readable storage medium.

BACKGROUND

With development of the Internet, online shopping is becoming more and more popular. An online buyer usually purchases by viewing product pictures displayed by a merchant. The product pictures may include: a picture showing only the product, a picture showing a model trying-on or wearing the product, and a picture showing details of the product.

In some cases, in order to show trying-on effect or wearing effect for a user, the user's physical feature information may be obtained, and the user's 3D model may established according to the obtained physical feature information, and then the product picture may be matched to the established 3D model to display a picture showing trying-on effect or wearing effect for the user.

SUMMARY

In an aspect of the disclosure, a virtual display method is provided, including: obtaining a first image including information on a first target which includes at least one of a shoe, a piece of clothes, and an accessory; extracting the information on the first target from the first image to generate a second image; and photographing a second target with the second image as a foreground to obtain and display a third image including the information on the first target and information on the second target which includes a human body.

In another aspect of the present disclosure, a virtual display device is provided, including: a first obtaining module, configured to obtain a first image including information on a first target which includes at least one of a shoe, a piece of clothes, and an accessory; an extraction module, configured to extract the information on the first target from the first image obtained by the first obtaining module to generate a second image; and a second obtaining module, configured to photograph a second target with the second image as a foreground to obtain a third image including the information on the first target and information on the second target and display the third image through a display module, wherein the second target includes a human body.

In another aspect of the present disclosure, an electronic apparatus is provided, including: a processor, a memory, a communication interface, and a communication bus, wherein the processor, the memory, and the communication interface communicates with one another via the communication bus, and wherein the memory stores thereon with executable instructions that cause the processor to perform the method as described above.

In another aspect of the present disclosure, a computer readable storage medium is provided, wherein the computer readable storage medium stores thereon with a computer program that, when executed by a processor, causes the method as described above to be implemented.

BRIEF DESCRIPTION OF THE DRAWINGS

In order to illustrate the technical solution of the present disclosure more clearly, embodiments will be described below in conjunction with the accompanying drawings.

DETAILED DESCRIPTION

Figure 1:
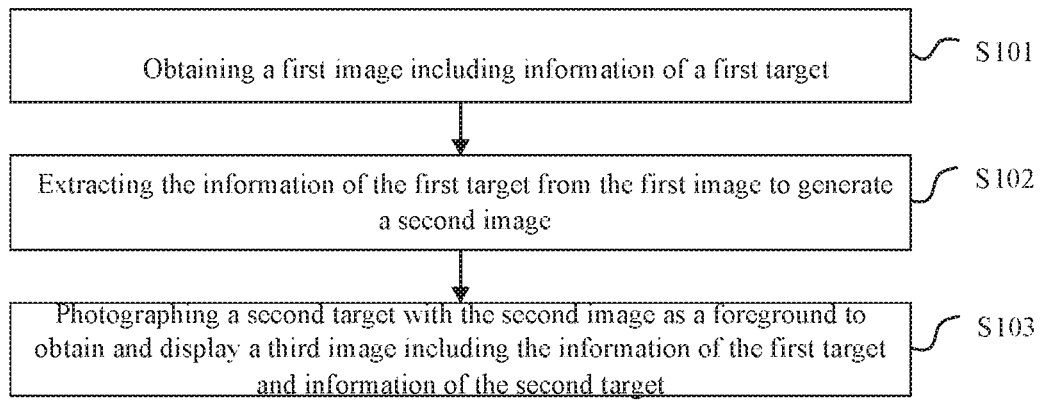
FIG. 1 is a flowchart illustrating a virtual display method according to an embodiment of the present disclosure.

Embodiments of the present disclosure are described in detail below. Throughout the present disclosure, same or similar reference numerals are used to represent the same or similar elements or elements having the same or similar functions. The embodiments described below in conjunction with the drawings are exemplary, and are used to explain the present disclosure rather than limit the scope of the present disclosure.

It should be understood that, the terms "a", "an", "the", "said" as used herein in a singular form may also include plural forms, unless explicitly stated otherwise. It should be further understood that, the term "include/comprise" as used herein refers to presence of described feature, integer, step, operation, element and/or component, but does not exclude the presence or addition of one or more additional features, integers, steps, operations, elements, components, and/or a combination thereof. It should be understood that, when an element is "connected" or "coupled" to another element, it can be directly connected or coupled to another element, or can be connected or coupled via an intermediate element. Additionally, the "connected" or "coupled" as used herein may include being connected or coupled wirelessly. The term "and/or" as used herein includes all the listed items, any member or any combination of one or more listed items.

The embodiments described below can be combined with each other. In some embodiments, same or similar concepts or processes will not be described repeatedly.

The present disclosure provides a virtual display method. As shown in FIG. 1, the method may include steps S101-S103.

At step S101, a first image including the information on the first target is obtained.

The first target includes at least one of a shoe, a piece of clothes, and an accessory.

In an embodiment of the present disclosure, the first image may be obtained by photographing an image displayed by a website including the information on the first target, or downloading an image displayed by the website including the information on the first target. In an embodiment of the present disclosure, the image displayed by the website may be an image displaying the shoe, an image displaying the piece of clothes, and an image displaying the accessory.

At step S102, information on the first target is extracted from the first image to generate a second image.

In an embodiment of the present disclosure, the first image may include background information and/or other feature information in addition to the information on the first target, so the information on the first target may be extracted from the first image, and a second image may be generated with the extracted information on the first target. That is, the second image only includes the information on the first target.

For example, the first image may be an image displaying the piece of clothes, which may include the information on the first target (e.g., clothes pixels) and background information (such as, background pixels). In this case, the information on the first target may be extracted from the image displaying the piece of clothes, and an image only including the clothes pixels may serve as the second image. That is, the second image only includes the clothes pixels.

At step S103, a second target is photographed with the second image as a foreground to obtain and display a third image including the information on the first target and information on the second target.

In an embodiment of the present disclosure, the second target may include a human body, and the information on the second target may include pixels of a user who is going to try on or wear the first target virtually, and the like.

In an embodiment of the present disclosure, the second target may be photographed in real time with the second image as a foreground. For example, a photographing manner may be adopted such that the display position of the first target of the second image matches the display position of the second target in the screen to obtain the third image. That is, in the third image, the position of the information on the second target matches the position of the information on the first target (for example, it appears as if the second target is wearing the first target).

The user can capture the third image including the information on the second target by self-photographing or photographing coordinated by others. In an embodiment of the present disclosure, if the self-photographing is adopted, the collecting device (for example, the device for photographing) can be hold by the user, and when the display position of the second target is observed to be matched with the display position of the first target of the second image as the foreground in the screen, the photographing may be performed; if the photographing coordinated by others is adopted, the collecting device can be hold by others cooperating with the user, and when the display position of the second target is observed to be matched with the display position of the first target of the second image as the foreground in the screen, the photographing may be performed.

In an embodiment of the present disclosure, by capturing the third image with the second image as a foreground, the position of the information on the second target can be closely matched with the position of the information on the first target in the captured third image, thereby improving the effect of virtual display and improving user experience.

Delayed photographing may also be performed. For example, when a trigger message, triggered by the user, for triggering delayed photographing is received, the photographing may be performed according to a time period for the delayed photographing. For example, when the trigger message for triggering delayed photographing is received, the photographing may be automatically performed after the time period for the delayed photographing, such as, 10 seconds. In an embodiment of the present disclosure, the time period for the delayed photographing may be set by the user, or may be preset by an electronic apparatus. The electronic apparatus can be a server or a terminal device.

When the delayed photographing is performed, the user can adjust the distance and posture within the time period for the delayed photographing. For example, the user can adjust posture, expression, distance, and so on, during the time period for the delayed photographing, to match the display position of the information on the first target of the second image as the foreground in the screen, thereby improving the effect of the virtual display.

Alternatively, the image including the information on the second target may be obtained from local memory, and the second target may be photographed with the second target as the foreground. In this case, the photographing may include synthesizing (combing).

In an embodiment of the present disclosure, if the third image is obtained in the terminal device, the third image may be displayed after the obtaining; if the third image is obtained (synthesized) in the server, the third image may be transferred to a corresponding terminal device after it is obtained, and may be displayed by the terminal device.

Compared with matching 3D model of a user with image of a product to be tried on, the virtual display method provided by the embodiment of the present disclosure does not need to establish a 3D model of the user through various physical feature information of the user in order to display an image showing virtual trying-on effect or virtual wearing effect for the user. Thereby, complexity of realizing the virtual display and amount of calculation required for realizing the virtual display can be reduced, and accordingly, cost of virtual display can be reduced.

According to another embodiment, the above step S102 may include steps S1021, S1022, and S1023 (not shown).

At step S1021, whether or not the first image includes model information is determined.

In an embodiment of the present disclosure, the first image may include two types of first images, that is, a first preset type of the first image and a second preset type of the first image. The first preset type of the first image includes information on the first target and background information; and the second preset type of the first image includes: information on the first target, background information, and model information (such as, model pixels). For example, the information on the first target pixel may be clothes pixels, accessory pixels, and the like.

At step S1022, when the first image does not include the model information, the information on the first target is extracted from the first image according to at least one of edge detection and image segmentation to generate the second image.

Extracting the information on the first target from the first image according to at least one of edge detection and image segmentation to generate the second image may include: detecting, according to the edge detection, corresponding position of each edge point in the first image; and removing background information in the first image according to the corresponding position of each edge point in the first image, to extract the information on the first target.

In an embodiment of the present disclosure, for the first image not including the model information, a single color different from the information on the first target is unusually taken as the background color when photographing the first target by the merchant, thus a point at which the color-scale changes sharply in the first image is an edge point. In an embodiment of the present disclosure, the color-scale change of the edge point can be obtained by finding the first derivative and the second derivative of the color-scale function of the first image not including the model information. Since the first derivative of the color-scale function of an image takes a maximum value at the edge point and the second derivative takes a value of zero at the edge point, classical edge detection algorithm typically utilizes the first or second derivative for edge detection.

In an embodiment of the present disclosure, an edge point of the first image not including the model information may be detected by using, for example, the Canny edge detection algorithm, and then image segmentation may be performed according to the position of the edge point. Since the first image not including the model information merely includes the information on the first target and the background information, the edge detected in the first image is the edge of the first target. Thereafter, image segmentation may be performed on the first image, that is, only pixels within the edge of the first target are retained, and pixels outside the edge are removed, to generate a second image including only the information on the first target.

For example, in a case where the first target is a piece of clothes, the Canny edge detection algorithm may be utilized to detect the edge of the clothes from the first image not including the model pixels, and then image segmentation may be performed according to the edge the clothes. That is, only the pixels within the edge of the clothes are retained, and the pixels outside the edge of the clothes are removed to generate a second image including only the clothes pixels.

At step S1023, when the first image includes the model information, the information on the first target is extracted from the first image according to at least one of user input, edge detection, feature recognition, and image segmentation to generate the second image.

Specifically, extracting the information on the first target from the first image according to at least one of user input, edge detection, feature recognition, and image segmentation to generate the second image may include: performing edge detection according to a user input, the user input may be a profile manually drawn on the screen by the user to exclude a part of the model other than the clothes; detecting corresponding position of each edge point in the first image according to the edge detection; detecting model information in the first image according to feature recognition; removing background information in the first image according to the corresponding position of each edge point in the first image, and removing the detected model information, to extract the information on the first target and generate the second image.

In an embodiment of the present disclosure, detecting the model information in the first image according to the feature recognition may include: detecting information corresponding to a model feature in the first image according to a feature recognition model. The model feature in the first image may include a feature such as a face, a neck, or the like of the model that is not covered by the first target. In an embodiment of the present disclosure, an iterative calculation method such as the AdaBoost algorithm may be utilized to continuously train a same training set, to obtain a plurality of different weak classifiers, from which a strong classifier may be obtained by weighted voting and may be utilized as the feature recognition model for detecting the model feature in the first image.

In the embodiments of the present disclosure, by removing the background information and/or the model information in the first image to extract the information on the first target from the first image, the information on the first target may be effectively separated from the background information and the model information, for example, the clothes pixels can be effectively separated from the background pixels and the model pixels.

In an embodiment of the present disclosure, before step S103, the method may further include steps SA-SB.

At step SA, a resizing page is displayed to allow trigger of a resizing operation.

At step SB, the first target displayed in the second image is resized when a triggered resizing operation is detected.

In an embodiment of the present disclosure, physical features of different users are different, while the size of the clothes or accessory displayed in the image obtained from a website (for example, a shopping website) may be a single size, thus the user needs to adjust the size thereof according to his/her physical features.

The resizing operation may include at least one of a stretching operation, a scaling operation, or an input operation.

When the resizing operation is the stretching operation or the scaling operation, the information on the first target in the second image may be stretched or scaled by a touch operation.

In an embodiment of the present disclosure, the user may perform the stretching operation or the scaling operation on the first target in the second image by sliding a finger on the displayed resizing page, to resize the display size of the first target in the second image.

For example, the first target may be a piece of clothes, and the user may stretch or scale the displayed clothes by sliding the finger to resize the clothes displayed in the second image.

In an embodiment of the present disclosure, the first target in the second image may be stretched or scaled by calling, for example, a Matrix in the system function.

When the resizing operation is the input operation, the first target displayed in the second image may be resized according to size information input by the user.

In an embodiment of the present disclosure, an input box may be popped up in the resizing page upon trigger of resizing button by the user. The input box can be used for the user to input body feature information. After receiving the body feature information input by the user, the server or the terminal device may automatically resize the first target displayed in the second image according to the body feature information input by the user. The body feature information may include: height, weight, waist circumference, hip circumference, and arm circumference.

In an embodiment of the present disclosure, by resizing the first target displayed in the second image, the first target can be easily matched with the second target in the third image, for example, the first target can cover the physical features of the second target which corresponds to the first target in the third image, thus the effect of virtual display can be improved.

In an embodiment of the present disclosure, the method may further include a step S104 (not shown).

At step S104, a blur processing is performed on the third image.

In an embodiment of the present disclosure, in the third image, there may be a relatively obvious boundary at the connection between the information on the second target and the information on the first target, thus the connection needs to be blurred. In an embodiment of the present disclosure, performing blur processing on the connection may include averaging pixels at the connection in the third image, such that the values of the pixels gets closer to achieve an effect of blurring.

Specifically, the step S104 may include: determining a connection position between the information on the first target and the information on the second target in the third image; and performing blur processing on pixels at the connection position between the information on the first target and the information on the second target.

Performing blur processing on pixels at the connection position between the information on the first target and the information on the second target may specifically include the following steps: performing blur processing on pixels within a circle centered on any pixel at the connection position (referred to as a connection point hereinafter) with a preset radius; switching the center of the circle to another connection point, and performing blur processing on pixels within a circle centered on the switched connection point; performing the above two steps repeatedly until the blurring process is completed on the connection.

Performing blur processing on pixels within a circle may include determining an average of each pixel within the circle, and then assigning the determined average to each pixel within the circle. The radius can be increased according to a preset step size, and then blur processing may be performed on each pixel within the circle with the increased radius. The preset step size can be set by the user or by a terminal or a server. The step of increasing the radius and performing blur processing on pixels within the circle with increased radius may be performed repeatedly until the radius is increased to the preset radius.

In an embodiment of the present disclosure, by performing the blurring process in the above manner, the pixels at the connection position between the information on the second target and the information on the first target can be transitioned smoothly in the third image, thereby improving the effect of virtual display.

In an embodiment of the present disclosure, the method may further include step S105 (not shown). At step S105, color-scale adjustment is performed on the third image.

In an embodiment of the present disclosure, in the third image, the color-scale of the information on the first target may be greatly different from the color-scale of the information on the second target, resulting in a lower matching degree. In order to improve the matching degree of the information on the first target and the information on the second target in the third image, it is necessary to perform color-scale adjustment on the third image.

Step S105 may include: obtaining intensity information on ambient light when photographing the second target with the second image as a foreground; determining color-scale adjustment information corresponding to the information on the first target in the third image according to the intensity information on ambient light; and adjusting a color-scale of the information on the first target in the third image according to the color-scale adjustment information.

In an embodiment of the present disclosure, intensity of ambient light can be sensed by a light sensor, and then overall color-scale adjustment may be performed, using the OpenCV library function, on the information on the first target through the R channel, the B channel and the G channel (referred to as RGB hereinafter).

Specifically, a dispersion Diff between a white field and a black field may be firstly calculated according to the intensity information on ambient light, that is, Diff=Highlight−Shadow, wherein Shadow is the low level data (black field) of an input color-scale, and Highlight is the high level data (white field) of the input color-scale; a dispersion between each pixel and the black field, which is referred to as rgbDiff, may be calculate respectively, wherein rgbDiff=RGB−Shadow, RGB is the value of the pixel before adjustment; if rgbDiff is greater than 0, a power of a reciprocal of the black field with a base being a ratio of rgbDiff to Diff may be calculated, to obtain the pixel component value clRGB after input color-scale adjustment, wherein clRGB=Power(rgbDiff/Diff, 1/Midtones), Midtones is an intermediate data (grey field) of the input color-scale, and Diff<0; a ratio of the dispersion of the white field and the black field of the output color-scale to 255 is calculated, and the ratio may be multiplied to the pixel component value after input color-scale adjustment, then the output black field value may be added to obtain the final pixel component values outClRGB after the color-scale adjustment, i.e., outClRGB=clRGB*(outHighlight−outShadow)/255+outShadow, outShadow is the output black field, and utHighlight is the output white field; and the information on the first target in the third image is adjusted in color-scale thereby.

In an embodiment of the present disclosure, by adjusting the color-scale of the information on the first target in the third image according to the intensity information on ambient light when the second target is photographed with the second image as the foreground, for example, the color-scale of the clothes in the third image may be adjusted, the matching degree of the information on the first target (for example, the clothes) with the light in the third image can be improved, thereby improving the effect of virtual display.

In an embodiment of the present disclosure, the color-scale of the information on the first target in the third image is adjusted according to the intensity information on ambient light when the second target is captured with the second image as the foreground, for example, the third image The color-scale of the clothes in the middle is adjusted, and the matching degree of the information on the first target (clothes) of the third image with the light can be improved, thereby improving the effect of the virtual display.

Figure 2:
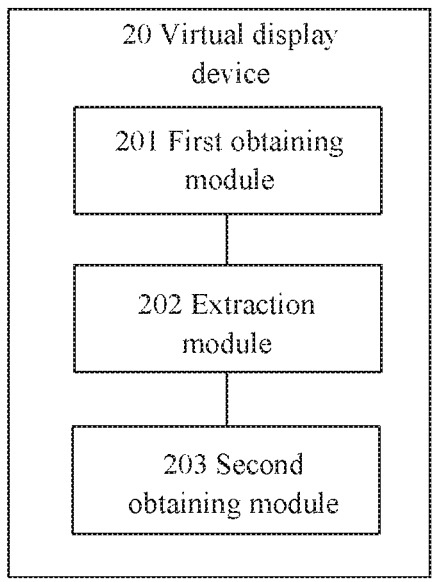
FIG. 2 is a structural diagram illustrating a virtual display device according to an embodiment of the present disclosure.

The present disclosure further provides a virtual display device. As shown in FIG. 2, the virtual display device 20 may include: a first obtaining module 201, an extraction module 202, and a second obtaining module 203.

The first obtaining module 201 is configured obtain a first image including information on a first target. The first target includes at least one of a shoe, a piece of clothes, and an accessory.

The extraction module 202 is configured to extract the information on the first target from the first image obtained by the first obtaining module 210 to generate a second image.

The second obtaining module 203 is configured to photograph a second target with the second image as a foreground to obtain a third image including the information on the first target and information on the second target and display the third image through a display module. The second target may include a human body.

In an embodiment, the first obtaining module 201 may be implemented by a camera and a memory, and in another embodiment, the first obtaining module 201 may be implemented by a browser and a memory. In an embodiment, the extraction module 202 may be implemented by a processor. In an embodiment, the second obtaining module 203 can be implemented by a camera and a memory.

Compared with matching 3D model of a user with image of a product to be tried on, the virtual display device provided by the embodiment of the present disclosure does not need to establish a 3D model of the user through various physical feature information of the user in order to display an image showing virtual trying-on effect or virtual wearing effect for the user. Thereby, complexity of realizing the virtual display and amount of calculation required for realizing the virtual display can be reduced, and accordingly, cost of virtual display can be reduced.

The virtual display device in embodiments of the present disclosure can implement the virtual display method provided in above embodiments, and details thereof will not be described herein again.

Figure 3:
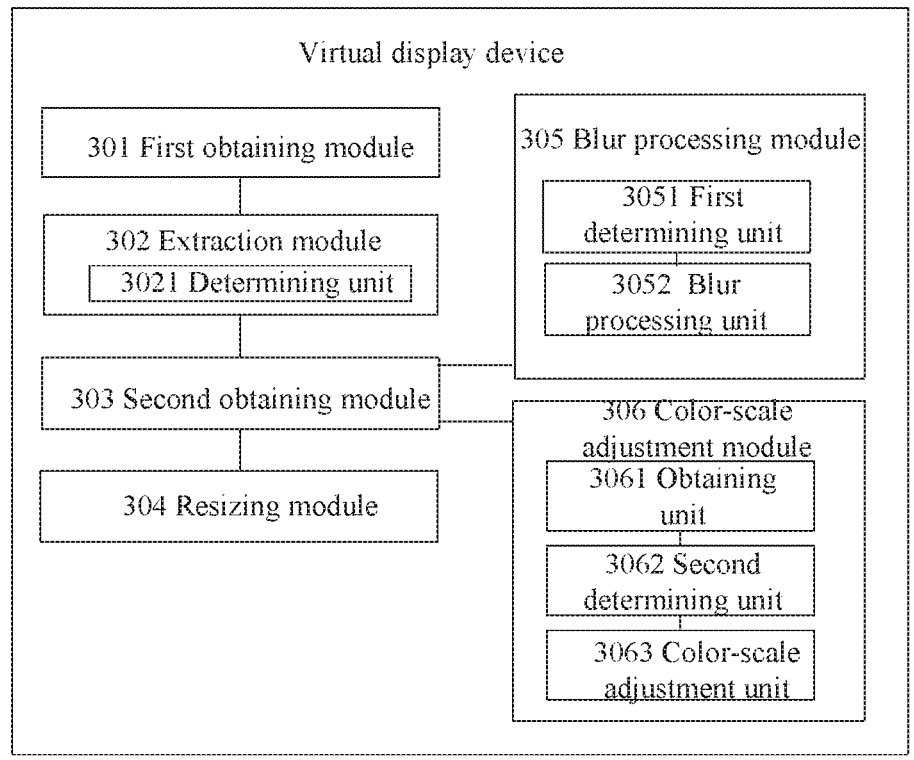
FIG. 3 is another structural diagram illustrating a virtual display device according to an embodiment of the present disclosure.

The present disclosure further provides another virtual display device. As shown in FIG. 3, the virtual display device 30 may include: a first obtaining module 301, an extraction module 302, and a second obtaining module 303.

The first obtaining module 301 is configured to obtain a first image including information on a first target. The first target includes at least one of a shoe, a piece of clothes, and an accessory. The first obtaining module 301 in FIG. 3 has a same or similar function as the first obtaining module 201 in FIG. 2.

The extraction module 302 is configured to extract the information on the first target from the first image obtained by the first obtaining module 210 to generate a second image. The extraction module 302 in FIG. 3 has a same or similar function as the extraction module 202 in FIG. 2.

The second obtaining module 303 is configured to photograph a second target with the second image as a foreground to obtain a third image including the information on the first target and the information on the second target and display the third image through a display module. The second target may include a human body. The second obtaining module 303 in FIG. 3 has a same or similar function as the second obtaining module 203 in FIG. 2.

In an embodiment, the first obtaining module 201 may be implemented by a camera and a memory, and in another embodiment, the first obtaining module 201 may be implemented by a browser and a memory. In an embodiment, the extraction module 202 may be implemented by a processor. In an embodiment, the second obtaining module 203 can be implemented by a camera and a memory.

In an embodiment, as shown in FIG. 3, the extraction module 302 further includes: a determining unit 3021 configured to determine whether the first image includes model information or not.

Specifically, the extraction module 302 is further configured to: extract, when the determining unit 3021 determines that the first image does not include the model information, the information on the first target from the first image according to at least one of edge detection and image segmentation to generate the second image; and extract, when the determining unit 3021 determines that the first image includes the model information, the information on the first target from the first image according to at least one of user input, edge detection, feature recognition, and image segmentation to generate the second image.

In an embodiment of the present disclosure, by removing the background information and/or model information in the first image to extract the information on the first target from the first image, the information on the first target can be effectively separated from the background information and the model information, for example, clothes pixels can be effectively separated from the background pixels and the model pixels.

In an embodiment, as shown in FIG. 3, the virtual display device 30 further includes an resizing module 304 configured to: display a resizing page through the display module to allow trigger of a resizing operation; and resize, when a triggered resizing operation is detected, the first target displayed in the second image. It should be understood that the virtual display device 30 further includes a display module (not shown) that is configured for display.

In an embodiment, the resizing operation may include at least one of: a stretching operation, a scaling operation, and an input operation. The resizing module 304 is further configured to: stretching or scaling, when the resizing operation is the stretching operation or the scaling operation, the first target displayed in the second image by a touch operation, and resizing, when the resizing operation is the input operation, the first target displayed in the second image according to input size information.

In an embodiment of the present disclosure, by resizing the first target displayed in the second image, the first target can be easily matched with the second target in the third image, for example, the first target can cover the physical features of the second target which corresponds to the first target in the third image, thus the effect of virtual display can be improved.

In an embodiment, as shown in FIG. 3, the virtual display device 30 further includes a blur processing module 305 configured to perform blur processing on the third image.

In an embodiment of the present disclosure, in the third image, there may be a relatively obvious boundary at the connection between the information on the second target and the information on the first target, thus the connection needs to be blurred. In an embodiment of the present disclosure, performing blur processing on the connection may include averaging pixels at the connection in the third image, such that the values of the pixels gets closer to achieve an effect of blurring.

The blur processing module 305 may include: a first determining unit 3051 and a blur processing unit 3052, wherein the first determining unit 3051 is configured to determine a connection position between the information on the first target and the information on the second target in the third image, and the blur processing unit 3052 is configured to perform blur processing on pixels at the connection position between the information on the first target and the information on the second target.

In an embodiment, as shown in FIG. 3, the virtual display device 30 further includes a color-scale adjustment module 306 configured to perform color-scale adjustment on the third image.

Specifically, the color-scale adjustment module 306 includes: an obtaining unit 3061, a second determining unit 3062, and a color-scale adjustment unit 3063, wherein the obtaining unit 3061 is configured to obtain intensity information on ambient light when photographing the second target with the second image as a foreground, the second determining unit 3062 is configured to determine color-scale adjustment information corresponding to the information on the first target in the third image according to the intensity information on ambient light obtained by the obtaining unit 3061, and the color-scale adjustment unit 3063 is configured to adjust a color-scale of the information on the first target in the third image according to the color-scale adjustment information determined by the second determining unit 3062.

In an embodiment of the present disclosure, by adjusting the color-scale of the information on the first target in the third image according to the intensity information on ambient light when the second target is photographed with the second image as the foreground, for example, the color-scale of the clothes in the third image may be adjusted, the matching degree of the information on the first target (for example, the clothes) with the light in the third image can be improved, thereby improving the effect of virtual display.

Compared with matching 3D model of a user with image of a product to be tried on, the virtual display device provided by the embodiment of the present disclosure does not need to establish a 3D model of the user through various physical feature information of the user in order to display an image showing virtual trying-on effect or virtual wearing effect for the user. Thereby, complexity of realizing the virtual display and amount of calculation required for realizing the virtual display can be reduced, and accordingly, cost of virtual display can be reduced.

The virtual display device can implement the virtual display method provided in above embodiments, and details thereof will not be described herein again.

Figure 4:
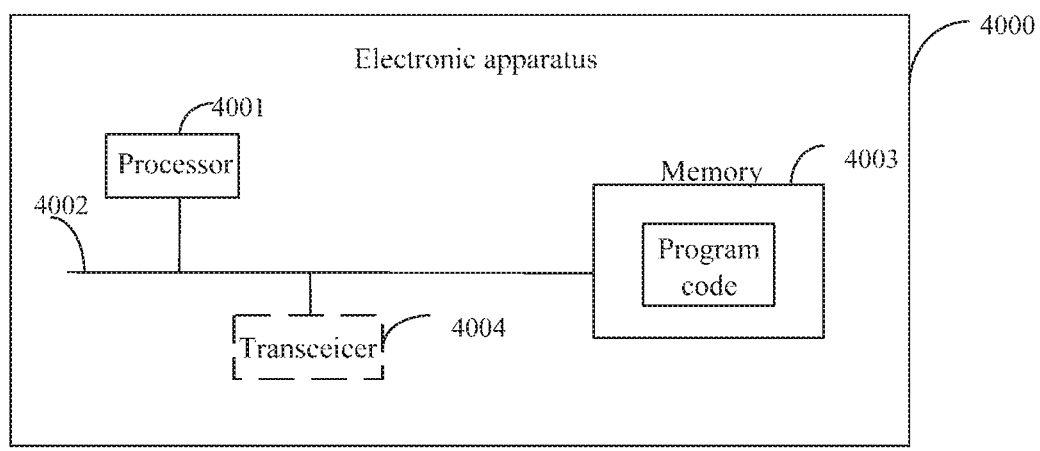
FIG. 4 is a structural diagram illustrating an electronic apparatus according to an embodiment of the present disclosure.

The present disclosure also provides an electronic apparatus. As shown in FIG. 4, the electronic apparatus 4000 of FIG. 4 includes a processor 4001 and a memory 4003. The processor 4001 and the memory 4003 are connected, for example, via a bus 4002. In an embodiment, electronic apparatus 4000 may also include a transceiver 4004.

The processor 4001 can be used to implement the functions of the various modules shown in FIG. 2 or FIG. 3. The transceiver 4004 may include a receiver and a transmitter.

The processor 4001 can be a CPU, a general purpose processor, a DSP, an ASIC, an FPGA, or other programmable logic device, a transistor logic device, a hardware component, or any combination thereof, and can implement or perform various example logical blocks and modules as described in connection with the contents disclosed by the present disclosure. The processor 4001 may further be, for example, a combination of one or more microprocessors, a combination of a DSP and a microprocessor, and the like.

The bus 4002 can include an address bus, a data bus, a control bus, and the like. The bus 4002 may be, for example, a PCI bus or an EISA bus or the like. For ease of representation, the bus 4002 is illustrated by merely one line in FIG. 4, but this does not mean that there is merely one bus or one type of bus.

The memory 4003 can be a ROM, a RAM, an EEPROM, a CD-ROM or other optical disc memory, an optical disc storage (including compact discs, laser discs, optical discs, digital versatile discs, Blu-ray discs, etc.), a magnetic disk storage media or other magnetic storage apparatus, or any other medium can carry or store desired program code in the form of instructions or data structures and can be accessed by a computer.

The memory 4003 stores thereon with program code, and the processor 4001 executes the program code stored in the memory 4003, such that the virtual display method provided in the above embodiments can be implemented.

Compared with matching 3D model of a user with image of a product to be tried on, the electronic apparatus provided by the embodiment of the present disclosure does not need to establish a 3D model of the user through various physical feature information of the user in order to display an image showing virtual trying-on effect or virtual wearing effect for the user. Thereby, complexity of realizing the virtual display and amount of calculation required for realizing the virtual display can be reduced, and accordingly, cost of virtual display can be reduced.

The electronic apparatus can implement the virtual display method provided in above embodiments, and details thereof will not be described herein again.

The present disclosure further provides a computer readable storage medium storing thereon with a computer program that, when executed by a processor, causes the virtual display method provided by the above embodiments to be implemented.

Compared with matching 3D model of a user with image of a product to be tried on, the computer readable storage medium provided by the embodiment of the present disclosure does not need to establish a 3D model of the user through various physical feature information of the user in order to display an image showing virtual trying-on effect or virtual wearing effect for the user. Thereby, complexity of realizing the virtual display and amount of calculation required for realizing the virtual display can be reduced, and accordingly, cost of virtual display can be reduced.

The computer readable storage medium can implement the virtual display method provided in above embodiments, and details thereof will not be described herein again.

The flowchart and block diagram in the drawings illustrate possible architectures, functions, and operations of a system, a method, and a computer program product according to various embodiments of the present disclosure. In this regard, each block in the flowchart or block diagram may represent a module, a program segment, or a portion of code including at least one executable instruction for implementing defined logical function. It should also be noted that, in some alternative implementations, the functions shown in a block may occur in a different order from that illustrated in the drawings. For example, two blocks connected in sequence may actually be executed substantially in parallel, and they may sometimes be executed in a reverse order, depending on the function involved. It should also be noted that each block in the flowchart and/or block diagram, and a combination of the blocks in the flowchart and/or block diagram can be implemented by a dedicated hardware-based system for performing a specified function or operation, or can be implemented by a combination of dedicated hardware and computer instructions.

The unit or module involved in an embodiment of the present disclosure may be implemented in software or in hardware. The unit or module may also be provided in a processor. For example, each of the units may be a software program provided in a computer or a smart mobile apparatus, or may be a separately configured hardware device. The name of the unit or module should not limit the unit or module itself in any manner.

The above embodiments are merely exemplary embodiments of the present disclosure. For those skilled in the art, various modifications and alterations may be made without departing from the principles of the disclosure. Such modifications and alterations should also be considered as falling within the scope of the present disclosure.

What is claimed is:

1. A virtual display method, comprising:
    obtaining a first image comprising information on a first target which comprises at least one of a shoe, a piece of clothes, and an accessory;
    extracting the information on the first target from the first image to generate a second image;
    photographing a second target with the second image as a foreground to obtain and display a third image comprising the information on the first target and information on the second target which comprises a human body, and performing blur processing on the third image, wherein the performing blur processing on the third image comprises:

determining a connection position between the information on the first target and the information on the second target in the third image; and performing blur processing on pixels at the connection position between the information on the first target and the information on the second target.

2. The method of claim 1, wherein the extracting the information on the first target from the first image to generate a second image comprises:

determining whether the first image comprises model information or not;

extracting, in response to the fact that the first image does not comprise the model information, the information on the first target from the first image according to at least one of edge detection and image segmentation to generate the second image; and extracting, in response to the first image comprising the model information, the information on the first target from the first image according to at least one of user input, edge detection, feature recognition, and image segmentation to generate the second image.

3. The method of claim 2, before the photographing the second target with the second image as a foreground, further comprising:

displaying a resizing page to allow trigger of a resizing operation; and resizing, in response to detecting a triggered resizing operation, the first target displayed in the second image.

4. The method of claim 3, wherein the resizing operation comprises at least one of a stretching operation, a scaling operation, and an input operation, and wherein, in response to the resizing operation being the stretching operation or the scaling operation, the resizing the first target displayed in the second image comprises stretching or scaling the first target displayed in the second image by a touch operation, and in response to the resizing operation being the input operation, the resizing the first target displayed in the second image comprises resizing the first target displayed in the second image according to input size information.

5. The method of claim 4, wherein a position of the information on the second target matches a position of the information on the first target in the third image.

6. The method of claim 5, further comprising:

performing color-scale adjustment on the third image, wherein the performing the color-scale adjustment on the third image comprises:

obtaining intensity information on ambient light when photographing the second target with the second image as a foreground;

determining color-scale adjustment information corresponding to the information on the first target in the third image according to the intensity information on ambient light; and adjusting a color-scale of the information on the first target in the third image according to the color-scale adjustment information.

7. A virtual display device, comprising:

a first obtaining module, configured to obtain a first image comprising information on a first target which comprises at least one of a shoe, a piece of clothes, and an accessory;

an extraction module, configured to extract the information on the first target from the first image obtained by the first obtaining module to generate a second image;

a second obtaining module, configured to photograph a second target with the second image as a foreground to obtain a third image comprising the information on the first target and information on the second target and display the third image through a display module, wherein the second target comprises a human body, and a blur processing module, configured to perform blur processing on the third image, wherein the blur processing module comprises: a first determining unit and a blur processing unit, the first determining unit is configured to determine a connection position between the information on the first target and the information on the second target in the third image; and the blur processing unit is configured to perform blur processing on pixels at the connection position between the information on the first target and the information on the second target.

8. The device of claim 7, wherein the extraction module further comprises a determining unit configured to determine whether the first image comprises model information or not, and wherein the extraction module is further configured to:

extract, in response to the determining unit determining that the first image does not comprise the model information, the information on the first target from the first image according to at least one of edge detection and image segmentation to generate the second image; and extract, in response to the determining unit determining that the first image comprises the model information, the information on the first target from the first image according to at least one of user input, edge detection, feature recognition, and image segmentation to generate the second image.

9. The device of claim 8, further comprising a resizing module configured to:

display a resizing page through the display module to allow trigger of a resizing operation; and resize, in response to detecting a triggered resizing operation, the first target displayed in the second image.

10. The device of claim 9, wherein the resizing operation comprises at least one of a stretching operation, a scaling operation, and an input operation, and wherein the resizing module is further configured to:

stretching or scaling, in response to the resizing operation being the stretching operation or the scaling operation, the first target displayed in the second image by a touch operation, and resizing, in response to the resizing operation being the input operation, the first target displayed in the second image according to input size information.

11. The device of claim 10, wherein a position of the information on the second target matches a position of the information on the first target in the third image.

12. The device of claim 11, further comprising: a color-scale adjustment module configured to perform color-scale adjustment on the third image, wherein the color-scale adjustment module comprises: an obtaining unit, a second determining unit, and a color-scale adjustment unit, the obtaining unit is configured to obtain intensity information on ambient light when photographing the second target with the second image as a foreground;

the second determining unit is configured to determine color-scale adjustment information corresponding to the information on the first target in the third image according to the intensity information on ambient light obtained by the obtaining unit; and the color-scale adjustment unit is configured to adjust a color-scale of the information on the first target in the third image according to the color-scale adjustment information determined by the second determining unit.

13. An electronic apparatus, comprising: a processor, a memory, a communication interface, and a communication bus, wherein the processor, the memory, and the communication interface communicates with one another via the communication bus, and wherein the memory stores thereon with executable instructions that cause the processor to perform the method of claim 1.

14. A non-transitory computer readable storage medium, wherein the computer readable storage medium stores thereon with a computer program that, when executed by a processor, causes the method of claim 1 to be implemented.

* * * * *